(12) United States Patent
Vega et al.

(10) Patent No.: US 6,605,676 B1
(45) Date of Patent: *Aug. 12, 2003

(54) PROCESS FOR OBTAINING POLYOLEFINS WITH BROAD BIMODAL OR MULTIMODAL MOLECULAR WEIGHT DISTRIBUTIONS

(75) Inventors: Wilfried Michiels Vega, Madrid (ES); Antonio Munoz-Escalona, Madrid (ES)

(73) Assignee: Repsol Quimica, S.A., Madrid (ES)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/580,734

(22) Filed: Dec. 28, 1995

(30) Foreign Application Priority Data

Dec. 30, 1994 (ES) ................................ 9402690

(51) Int. Cl.⁷ .................................. C08F 4/42
(52) U.S. Cl. ....................... 526/160; 526/132; 526/127; 526/153; 526/348.2; 526/348.4; 526/348.5; 526/352; 526/905; 526/943
(58) Field of Search .................. 526/132, 127, 526/153, 160, 348.2, 348.4, 348.5, 352, 905, 943

(56) References Cited

U.S. PATENT DOCUMENTS

| | | | |
|---|---|---|---|
| 4,338,424 A | 7/1982 | Morita et al. | 526/65 |
| 4,414,369 A | 11/1983 | Kuroda et al. | 526/65 |
| 4,420,592 A | 12/1983 | Kato et al. | 526/65 |
| 4,703,094 A | 10/1987 | Raufast | 526/65 |
| 4,939,217 A | 7/1990 | Stricklen | 526/114 |
| 5,064,797 A | 11/1991 | Stricklen | 502/111 |
| 5,153,157 A | * 10/1992 | Hlatky et al. | 502/117 |
| 5,308,816 A | * 5/1994 | Tsutsui et al. | 502/108 |
| 5,369,196 A | * 11/1994 | Matsumoto et al. | 526/127 |
| 5,444,134 A | * 8/1995 | Matsumoto | 526/159 |
| 5,474,962 A | * 12/1995 | Takahashi et al. | 502/129 |

FOREIGN PATENT DOCUMENTS

| | | |
|---|---|---|
| CA | 2027144 | 4/1991 |
| DE | 2608863 | 1/1989 |
| EP | 128 045 | 12/1984 |
| EP | 277 004 | 8/1988 |
| EP | 310 734 | 4/1989 |
| EP | 426 637 | 5/1991 |
| EP | 552945 | 7/1993 |
| EP | 570 982 | 11/1993 |
| EP | 571987 | 12/1993 |
| EP | 574 258 | 12/1993 |
| EP | 0574258 | * 12/1993 |
| JP | 5043618 | 2/1993 |
| JP | 5140221 | 6/1993 |
| JP | 5155927 | 6/1993 |
| JP | 5239140 | 9/1993 |
| JP | 5255423 | 10/1993 |
| JP | 5262823 | 10/1993 |
| JP | 5271339 | 10/1993 |
| JP | 5295021 | 11/1993 |
| JP | 5301919 | 11/1993 |
| JP | 5310829 | 11/1993 |
| JP | 5320245 | 12/1993 |
| JP | 5320246 | 12/1993 |
| JP | 5320247 | 12/1993 |
| JP | 5320258 | 12/1993 |
| JP | 5320259 | 12/1993 |
| JP | 5320260 | 12/1993 |
| JP | 5331219 | 12/1993 |
| JP | 5339316 | 12/1993 |
| WO | WO 92/15619 | 3/1992 |
| WO | WO 93/24541 | 3/1993 |

OTHER PUBLICATIONS

Kaminsky, Metallocene Catalysts, SP'92 Polyethylene World Congress, Dec. 7, 1992.
Fahey, Metallocene Catalysts: A Revolution in Olefin Polymerization, USPTO Seminar, 1995.
Chien et al., Zirconocenium Cation Catalysts of Propene Polymerization, Makromol. Chem., Macromol. Symp. 66, 141–156 (1993).
Sinn et al., Ziegler–Natta Catalysis, Advances in Organometallic Chemistry, vol. 18, 99, 1980.

* cited by examiner

*Primary Examiner*—David W. Wu
*Assistant Examiner*—Lin-Siu Choi
(74) *Attorney, Agent, or Firm*—Law Offices of John A. Parrish

(57) ABSTRACT

The process is characterized by the use of catalyst systems consisting of a single metallocene catalyst activated with mixtures of at least 2 co-catalysts. The co-catalysts are aluminium alkyls, aluminoxanes or boron compounds. Different active centers are produced in the catalyst through the use of these mixed co-catalyst systems, each having different rates of initiation and completion of the polymerization reaction, which give rise to polyolefins with different molecular weights, resulting in products with broad bimodal or multimodal molecular weight distributions and the incorporation of co-monomer can be controlled by appropriate selection of the metallocene and use of combinations of different types of co-catalysts, as well as by varying the reactor pressure, the reaction temperature and the molar ratios between the various components of the catalyst system. A broad bimodal or multimodal molecular weight distribution can be achieved in both the presence and absence of hydrogen during the polymerization reaction. Likewise broad bimodal and multimodal molecular weight distributions can be obtained in polymers by varying the order in which the components of the catalyst system are added. This process may also be used with both homogeneous and heterogenous metallocene catalysts.

24 Claims, 1 Drawing Sheet

PROCESS FOR OBTAINING POLYOLEFINS WITH BROAD BIMODAL OR MULTIMODAL MOLECULAR WEIGHT DISTRIBUTIONS

FIELD OF THE INVENTION

This invention relates to a process for obtaining broad bimodal or multimodal molecular weights.

BACKGROUND OF THE INVENTION

It is known that some metallocenes such as bis (cyclopentadienyl) titanium or dialkyl zirconium in combination with aluminium alkyls as co-catalyst form homogeneous systems which are useful for the polymerisation of ethylene. German patent 2,608,863 describes the system of dialkyl bis(cyclopentadienyl) titanium with trialkyl aluminium.

The controlled hydrolysis of aluminium alkyls leads to the formation of species which include Al—O bonds called aluminoxanes. Kaminsky et al. (Adv. Organomet. Chem. 18, 99, 1980) have demonstrated that aluminoxanes in combination with chlorinated metallocenes produce very active catalytic systems for the polymerization of ethylene. The need to reduce or eliminate aluminoxanes, as these are highly flammable, and are used in large proportions in relation to the metal in polymerization reactions, led to the use of bulky boron compounds which replaced the aluminoxane in stoichiometric molar relationships with respect to the metal of the metallocene, as described in the patents by Turner, EP 277004 and Ewen et al., EP 426637. The metallocenes used in these patents should be dialkyl derivatives, as boron compounds do not have any alkylating capacity. Alkylated metallocenes are highly unstable with water, oxygen and air, with the result that a large proportion of the metallocene present becomes deactivated before polymerization starts, as it is used up in reacting with the impurities which are present in the medium which have not been eliminated previously. This does not happen when aluminium compounds such as aluminoxane are used, as these act to eliminate impurities from the reaction medium avoiding deactivation of the metallocene.

The use of metallocenes in combination with aluminium alkyls and aluminoxanes and boron compounds has been described by Razavi et al. in CA 2,027,144 for the polymerization of syndiotactic polyolefins, with the objective of using small quantities of aluminium compound to remove the impurities and alkylate the metallocene. More recently, Chien et al. (Macromol. Chem. Macromol. Symp., 66, 141–156, 1993) have also used small quantities of aluminium alkyls, generally triethyl aluminium or trisobutyl aluminium, with the same object of removing impurities and alkylating the chlorinated metallocene, finally adding the boron compound as an activator for the reaction. This system makes it possible to use chlorinated metallocenes, which are stable in air, reducing the amount of aluminium compounds in the catalyst system.

On the other hand these authors comment that the use of these alkyl aluminiums together with these boron compounds is not obvious, because secondary β-H elimination reactions, or reactions wherein the boron compound may interfere with the catalytic system, can occur. Many patents have appeared in the last year claiming the use of these mixed co-catalyst systems, e.g. Mitsubishi Petrochemical Co. Ltd. (EP 574258, JP 5295021); Tosoh Corp. (JP 5339316, JP 5310829, JP 5301919, EP 570982, JP 5255423, JP 5239140); Idemitsu Kosan Co. Ltd. (JP 5331219, WO 9324541, JP 5320258-60, JP 5320245-48, JP 5271339, JP 5262823, JP 5262827, JP 5043618); Mitsui Toatsu (JP 5155927, JP 5140221). All these patents claim the use of a smaller quantity of aluminoxane as advantages in the use of mixed co-catalysts, and greater activity and better properties for the polymer, such as e.g. improved processability, high heat resistance, good transparency, etc.

The term "bimodal or multimodal molecular weight distribution" means that two or more peaks of different molecular weight can be seen in chromatograms obtained by gel chromatography (GPC), which represent the molecular weight as a function of the relative proportion of polymer having a specific molecular weight.

Polyolefins which have bimodal or multimodal molecular weight distributions, like polyethylene, can be transformed into articles by extrusion moulding, hot shaping, spin moulding, etc., and in general their most common applications are for tubing, films and articles made by the blowing technique. The advantages over other polyolefins which do not have multimodal molecular weight distributions are easier and faster processing with a reduced energy requirement. In addition to this, bimodal polyolefins show less flow disturbances when molten and are preferred on account of their improved properties such as a better balance between rigidity and resistance to cracking through environmental agents.

There are in the literature different ways to obtain polymers with broad bimodal or multimodal molecular weight distributions, such as the use of reactors in series, performing polymerization with a catalyst in the absence of hydrogen (which acts as a chain transfer agent reducing the molecular weight) in the first of these reactors, yielding a high molecular weight fraction, and then passing the polymer through a second reactor in which the polymerization is continued in the presence of hydrogen to produce another fraction of lower molecular weight. Examples of this process are the patents by Morita et al., U.S. Pat. No. 4,338,424, Kuroda et al. U.S. Pat. No. 4,414,369, Rafaut U.S. Pat. No. 4,703,094, Kato et al., U.S. Pat. No. 4,420,592. These methods to produce polymers with a multimodal molecular weight distribution are consequently expensive, complicated and require a longer time, and require more complex plant.

Another way of obtaining these multimodal polymers is through the use of a single reactor, but using mixtures of two or more different catalysts. Each catalyst produces a polymer having a different molecular weight and molecular weight distribution according to the polymerization reaction rate constants for each catalyst, or as a result of differences in reactive behaviour to different monomers and/or the presence of $H_2$, e.g. Ewen et al., EP 128045, use mixtures of different metallocenes, with different rates of propagation and reaction with respect to the same monomer. In another patent, EP 128046, Ewen et al. use mixtures of metallocenes with different reactivities to different monomers. With the same object Stricklen et al., U.S. Pat. No. 4,939,217 and U.S. Pat. No. 5,064,797, on the other hand use two or more metallocenes alkylated with MAO, with a different behaviour to $H_2$, obtaining polymers with different molecular weights. In another patent, WO 9215619, Stricklen et al. effect polymerization in two stages, the first being a homopolymerization in the presence of $H_2$ and the second a copolymerization in the presence of $H_2$. Ewen et al., EP 310734, use mixtures of two chiral stereorigid metallocenes for the same purpose. However, it is difficult to control the feed of the two catalysts, and, as the particles are not of uniform size, segregation processes occur during storage and transfer of the polymer resulting in non-homogeneous polymer mixtures.

SUMMARY OF THE INVENTION

Figure 1:
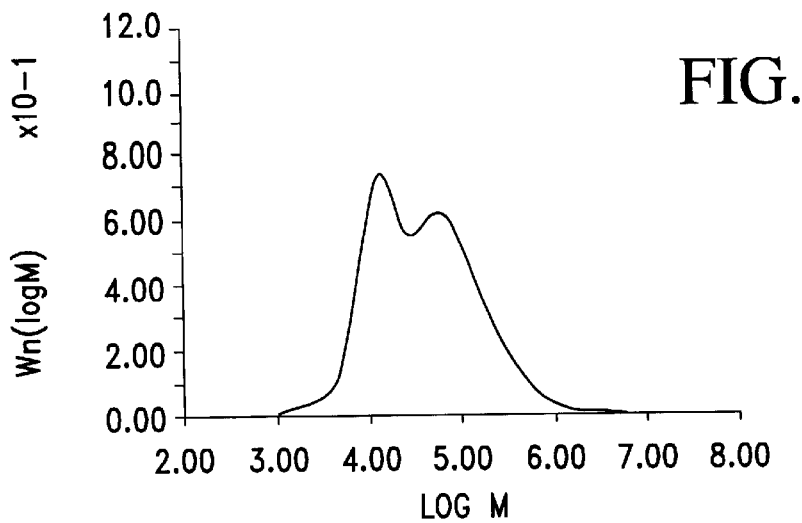
FIG. 1 illustrates bimodal molecular weight distributions produced by the invention.

This invention claims the manufacture of polymers or copolymers of alpha-olefins with broad bimodal or multimodal molecular weight distributions in a single reactor using catalyst systems which differ from those previously patented in that a single metallocene catalyst is used in combination with mixtures of two or more compounds which act as co-catalysts. These polymers are obtained in good yield and with the good processability characteristics and properties described above.

DETAILED DESCRIPTION OF THE INVENTION

This invention is characterized by the manufacture of polyolefins having broad bimodal and multimodal molecular weight distributions using a) a single metallocene catalyst and b) at least two co-catalysts as the catalyst system. The system provided has different active centres, with different polymerization reaction initiation and rate constants as are required for the formation of polymer fractions having different molecular weights. The difference from the other patents described, based on mixtures of catalysts, is the formation of a catalyst system from a single catalyst which is capable of forming multiple active centers.

In particular the polymers according to the invention are ethylene homopolymers, but nevertheless the use of small quantities of higher alpha-olefins having from 3 to 10 carbon atoms and preferably from 4 to 8 carbon atoms can produce ethylene copolymers. Illustrated examples of these higher alpha-olefins are 1-butene, 1-hexene and 1-octene.

In this invention, ethylene, alone or with smaller quantities of alpha-olefin, is polymerized in the presence of a catalyst system which consists of a) a single metallocene as catalyst and b) at least two compounds as co-catalysts.

The metallocenes used are organometallic coordination compounds of mono, di and tricyclopentadienyl and its transition metal derivatives from groups 4b, 5b and 6b of the Periodic Table of Elements.

The preferred metallocenes for use in accordance with this invention are represented by the general formulae:

$$(C_5R'_m)_p R''_s (C_5R''_m) MeQ_{3-p} \quad (1)$$

or

$$R''_s (C_5R'_m)_2 MeQ' \quad (2)$$

where $(C_5R'_m)$ is cyclopentadienyl or substituted cyclopentadienyl, each R' may be the same or different, and may be hydrogen, monohydrocarbon radicals such as alkyl, alkenyl, aryl, alkylaryl or arylalkyl containing 1 to 20 carbon atoms, or two adjacent carbon atoms joined to form a C4–C6 ring, or various condensed rings, R" is an alkylene radical containing between 1 and 4 carbon atoms, a dialkyl germanium or silicon radical, or an alkylphosphine or amine radical joining two $(C_5R'_m)$ rings, Q is a hydrocarbon radical such as aryl, alkyl, alkenyl, alkyl aryl, aryl alkyl containing from 1 to 20 carbon atoms, or halogen, and each one may be the same or different, Q' is an alkylidine radical containing from 1 to 20 carbon atoms, Me is a transition metal from groups 4b, 5b or 6b of the Periodic Table of elements, s is 0 or 1, p is 0, 1 or 2; when p is 0, s is 0; m is 4 if s is 1 and m is 5 if s is 0.

Examples of hydrocarbon radicals are methyl, ethyl, propyl, butyl, amyl, isoamyl, hexyl, isobutyl, heptyl, octyl, nonyl, decyl, cetyl, 2-ethylhexyl, phenyl and the like.

Examples of alkylene bridges are methylene, ethylene, propylene and the like.

Examples of halogen atoms are chlorine, bromine and iodine, the preferred halogen being chlorine.

Examples of alkylidine radicals are methylidene, ethylidene and propylidene.

The metallocenes used in accordance with this invention are preferably mono, bis or tris cyclopentadienyl or substituted cyclopentadienyls of titanium (IV) or zirconium (IV) represented in the general formula.

Illustrative but not restrictive examples of the metallocenes used in this invention are titanium monocyclopentadienyls such as cyclopentadienyl titanium trichloride, pentamethylcyclopentadienyl titanium trichloride, titanium biscyclopentadienyls such as bis(cyclopentadienyl) titanium dichloride, dimethyl bis(cyclopentadienyl) titanium, diphenyl bis(cyclopentadienyl) titanium, bis(indenyl) titanium dichloride, dimethyl bis(indenyl) titanium, diphenyl bis (cyclopentadienyl) titanium, diphenyl or dihalo bis (methylcyclopentadienyl) titanium, dialkyl, trialkyl, tetralkyl and pentaalkyl cyclopentadienyl derivatives such as diphenyl or dihalo, bis(1, 2-dimethyl cyclopentadienyl) titanium, dimethyl or dihalo bis (1,2-diethyl cyclopentadienyl) titanium and other complex dialkyls or dihalides.

Illustrative but not restrictive examples of appropriate zirconium metallocenes for use in this invention are zirconium monocyclopentadienyls such as cyclopentadienyl zirconium dichloride, pentamethylcyclopentadienyl zirconium trichloride, zirconium biscyclopentadienyls such as bis (cyclopentadienyl) zirconium dichloride, dimethyl bis (cyclopentadienyl) zirconium, diphenyl bis (cyclopentadienyl) zirconium, substituted cyclopentadienyl alkyls such as dimethyl or dihalo bis(ethylcyclopentadienyl) zirconium, diphenyl or dihalo bis (methylcyclopentadienyl) zirconium, dialkyl, trialkyl, tetralkyl and pentaalkyl cyclopentadienyl (pentamethylcyclopentadienyl) (cyclopentadienyl) zirconium dichloride, dimethyl or dihalo bis (pentamethylcyclopentadienyl) zirconium, dimethyl bis (1,2-dimethylcyclopentadienyl) zirconium, and others of the kind.

Silicon, phosphorus and carbon bridges between cyclopentadienyl rings such as e.g. dimethyl or dihalo dimethylsilylbis (cyclopentadienyl) zirconium, dimethyl or dihalo methylphosphene bis(cyclopentadienyl) zirconium, dimethyl or dihalo methylene bis(cyclopentadienyl) zirconium, carbenes represented by the formula $CP_2Zr=CH_2P(C_6H_5)_2CH_3$, and derivatives of these compounds such as $CP_2ZrCH_2CH(CH_3)CH_2$.

Biscyclopentadienyl hafnium dichloride, dimethyl bis (cyclopentadienyl) hafnium, bis(cyclopentadienyl) vanadium dichloride are illustrative of other metallocenes.

The compounds which can act as co-catalysts in the polymerization of olefins and which are useful for use in accordance with this invention are well known in the literature, and can be divided into three groups:

(a) Aluminium compounds of general formula:

$$AlR'''_3 \tag{3}$$

where the R''' groups, which are the same or different, may be alkyls or aryls containing from 1 to 20 carbon atoms, or halogens, and Al is aluminium.

Illustrative but not restrictive examples of compounds in this group of aluminium compounds are trimethyl aluminium, triethyl aluminium, triisobutyl aluminium, aluminium diethyl chloride, aluminium monoethyl chloride, triphenyl aluminium and the like.

(b) Aluminium compounds incorporating Al—O bonds (aluminoxanes) of general formula:

$$(RAlO)_n \tag{4}$$

or $$R(R-Al-O)_n AlR_2 \tag{5}$$

where R is an alkyl or aryl group containing from 1 to 20 carbon atoms, and n is a number from 1 to 20. These compounds are known in the literature as aluminoxanes and have two different structures, linear and cyclic. In this invention the compound when R=methyl is preferred, i.e. methyl aluminoxane (MAO).

(c) Boron compounds having the general formulae:

$$BX^1X^2X^3 \tag{6}$$

OR $$[Y][BX^1X^2X^3X^4]$$

where B is boron, $X^1$, $X_2$, $X_3$, $X_4$, which are the same or different, may be hydride, halide, alkyl containing from 1 to 20 carbon atoms, substituted alkyls containing from 1 to 20 carbon atoms, in which one or more hydrogens are substituted by halogens, metallohydrocarbon radicals (organometalloids) in which each substitution contains from 1 to 20 carbon atoms and the metal is selected from group 4a of the Periodic Table of elements, aryl, substituted aryls containing from 6 to 20 carbon atoms. Non-restrictive examples of these substituents are phenyl, naphthyl and anthracenyl. The aryl groups can be substituted by other groups such as alkoxy and alkylamido radicals, fluorine or halogen-substituted hydrocarbon groups.

And it may be a Bronsted acid, such as H+, ammonium or substituted ammonia cations in which up to 3 of the hydrogen atoms may be replaced by hydrocarbon radicals containing from 1 to 20 carbon atoms or substituted hydrocarbon radicals in which one or more of the hydrogen atoms are substituted by halogens, phosphonium radicals or substituted phosphonium radicals in which up to 3 hydrogens may be substituted by hydrocarbon radicals containing from 1 to 20 carbon atoms, or substituted hydrocarbon radicals in which one or more of the hydrogens may be substituted by halogens, or carbene radicals in which up to 3 of the hydrogens may be replaced by hydrocarbon radicals containing from 1 to 20 carbon atoms, or substituted hydrocarbon radicals in which one or more hydrogens may be substituted by halogens.

Illustrative but not restrictive examples in accordance with their use in this invention are triphenyl borane, pentafluorophenyl diphenyl borane, tris(pentrafluorophenyl) borane, tris(3,5-di-trifluoromethylphenyl) borane, triethyl ammonium tetraphenyl borate, tripropyl ammonium tetraphenyl borate, tris(n-butyl) ammonium tetraphenyl borate, trimethyl ammonium tetrakis(p-tolyl) borate, tributyl ammonium tetrakis(pentafluorophenyl) borate, tributylammonium tetrakis(3,5-dimethylphenyl) borate, and the like. Other examples of N,N'-dialkylanilino salts are for example N,N'-diethylanilinotetraphenyl borate, N,N'-dimethylanilino tetrakis(pentafluorophenyl) borate, triarylphosphonium derivative salts such as e.g. triphenylphosphonium tetraphenylborate, tri (methylphenyl)phosphonium tetrakis (pentaf luorophenyl) borate, carbene derivatives such as e.g. triphenylcarbene tetrakis(pentafluorophenyl) borane and similar compounds.

In accordance with this invention these compounds, which act as co-catalysts in the catalytic system together with the metallocene, should take part forming mixtures of at least two compounds for the polymerization of olefins producing polymers having broad bimodal and multimodal molecular weight distributions.

Combinations between the three groups of compounds formulated above may be used in this invention, and the following combinations are appropriate:
Aluminium alkyls and aluminoxanes,
Aluminium alkyls and boron compounds,
Aluminium alkyls and aluminoxanes and boron compounds,
Aluminoxanes and boron compounds.

The proportions used in these co-catalyst systems containing more than one co-catalyst vary depending on the metallocene compound used. The molar ratios between the aluminium compounds (aluminium alkyls and/or aluminoxanes) and transition metals of the metallocene vary from 1:1 to $10^8$:1, preferably from 5:1 to $10^5$:1. Molar ratios between aluminium compounds (aluminium alkyls and/or aluminoxanes) and boron compounds vary from 0.01:1 to $10^4$:1, preferably from 0.1:1 to $10^{3:1}$. The molar ratios used between compounds of boron and the transition metal of the metallocene will be determined by the ratios between the compounds of aluminium and the transition metal and the molar ratios between the aluminium compound and the boron compound.

The distribution of molecular weights and the incorporation of co-monomer in each fraction of molecular weight is controlled by appropriate selection of the metallocene and combinations to form the mixture of co-catalysts, and the variables $H_2$ content, pressure and temperature, and the molar ratios between the different components of the catalyst system.

Broad bimodal or multimodal molecular weight distributions may be obtained by adding the components of the catalyst system, catalyst and co-catalysts, to the reaction medium separately or premixed. Broad bimodal or multimodal distributions can be achieved with addition in any order.

The solvents used in preparation of the catalytic system are inert hydrocarbons, particularly those inert to the catalyst system, which is sensitive to impurities such as traces of water, oxygen, air, etc. These solvents are e.g. butane, isobutane, pentane, hexane, heptane, octane, cyclohexane, methyl cyclohexane, toluene, xylene, petroleum fractions from fractions of different boiling point and the like. The co-catalyst described should be used with hydrocarbon solvents such as e.g. toluene or xylene and the like in concentrations from 0.1 M to 3.0 M, although higher or lower concentrations may be used.

The catalyst systems described in this invention are useful for the polymerization of alpha-olefins in solution, slurries or the gas phase over a wide range of temperatures and pressures. For example temperatures may vary from −60° C. to 280° C., and preferably from 40° C. to 160° C. Pressures vary from 1 to 500 atmospheres or higher. The polymerization time may vary from 1 minute to 6 hours, but frequently from 10 minutes to 2 hours.

Polymerization in solution makes it possible to use the catalyst system as a homogeneous system, but nevertheless the catalyst system may be converted into a heterogeneous system by supporting the metallocene on typical supports, using techniques known in the literature. The supports may be inorganic supports such as silica, silica-alumina, alumina, metal oxides in general, $MgCl_2$, etc., or may be organic such as polyethylene, polybutadiene, etc. The solid system is more appropriate for slurry or gas phase polymerization.

Heterogeneous catalysts are preferable for the production of polymers such as polyethylene, as the active centers are sufficiently fixed and separated on the support, avoiding deactivation reactions between them, and generally higher molecular weights are obtained. In addition to this the particle shape, size and size distribution of the resulting polymer is better controlled using supported catalysts.

Polymers obtained according to this invention have average molecular weights which may vary from 500 to $10^7$ by weight. It is also possible to use $H_2$ to control the molecular weight of the polymers formed, but this is not always necessary as it can also be adjusted by varying the molar ratios between the different components of the catalyst system, the metallocene concentrations, the reaction temperature, etc.

In the examples which follow molecular weights have been determined using a Walters ALC/GPC Model 150C apparatus equipped with a Viscatek 110 viscometer using Polymer Laboratory Columns (2×mixed bed, $10^7$ and another of $10^6$). Measurements were performed by dissolving the polymer samples in trichlorobenzene (TCB) at 145° C. and filtering them. Irganox 1010 was used as antioxidant. The flow rate was 1 ml/min with concentrations of 1.5 mg/ml.

EXAMPLES

Example 1a

This example serves to describe the preparation of a polymer having a narrow monomodal distribution when a metallocene and a single co-catalyst of the aluminoxane type is used. A glass reactor of 1 l capacity equipped with a mechanical stirrer, an outer jacket for temperature control, an inlet feed for monomers and gases, an inlet feed with a septum for adding doses of the catalyst system with a syringe, was dried and deoxygenated using a flow of nitrogen. 400 ml of dry n-heptane were added directly with continuous stirring (1200 rpm). The nitrogen atmosphere was removed by charging and discharging the vessel with ethylene until the solution became saturated with ethylene. This was then heated to 90° C. and 2.0 mols of methyl aluminoxane (MAO, 1.5 M solution in toluene) were added. After the ethylene pressure increased to 4 bars, 5.84 mg (0.02 mmol) of bis(cyclopentadienyl) zirconium dichloride dissolved in toluene were added using a syringe. After 15 minutes the reactor was depressurised and the reaction mixture cooled. The polymer was discharged and washed with slightly acidified methanol to deactivate catalyst residues and dried to constant weight in a vacuum stove. 27.89 g of white polyethylene powder were obtained with an average molecular weight of 69000 and a polydispersity index of Mw/Mn=3.5. The molecular weight distribution was narrow and monomodal.

Example 1b

This example serves to describe the preparation of a polymer having a narrow monomodal distribution when an alkylated metallocene and a single co-catalyst of the boron compound type is used. From a flask of 500 ml capacity equipped with septum inlets and a magnetic stirrer oxygen was removed by displacement with flows of nitrogen and 200 ml of dry N-heptane were injected. This was then placed in a thermostatic bath and the nitrogen atmosphere was replaced by ethylene by successive charging and discharging with ethylene. 51.2 mg (0.1 mmoles) of tris (pentafluorophenyl) borane dissolved in toluene (0.1 M) were introduced into the flask through the septum using a syringe with a hypodermic needle. When the solution was saturated with ethylene and the temperature was 40° C., 25.0 mg (0.1 mmoles) of dimethyl bis(cyclopentadienyl) zirconium dissolved in toluene (0.1 M) were injected directly into the flask. After 15 minutes reaction 6.92 g of polyethylene having a molecular weight of Mw=189,000 and a polydispersity index of Mw/Mn=2.4 were obtained. The molecular weight distribution was narrow and monomodal. Both the $CP_2ZrMe_2$ and the $B(C_6F_5)_3$ were prepared in accordance with the methods described in the literature.

The ten examples which follow describe the production of a bimodal homopolymer or copolymer according to the method described in this invention.

Example 2

This example describes the preparation of a bimodal polyethylene. 200 ml of dry n-heptane were injected under a nitrogen atmosphere into a dry 500 ml capacity flask from which oxygen had been removed using a flow of nitrogen, equipped with inlets provided with a septum and a magnetic stirrer. This was then placed in a thermostatic bath and the nitrogen atmosphere was replaced with ethylene by successive charging and discharging with ethylene. 10.0 mmoles of methylaluminoxane and subsequently 51.2 mg (0.1 mmoles) of tris(pentafluorophenyl) borane dissolved in toluene (0.1 M) were introduced using a syringe with a hypodermic needle. When the solution was saturated with ethylene and the temperature was 40° C., 29.2 mg (0.1 mmoles) of bis(cyclopentadienyl)zirconium dichloride dissolved in toluene (0.1 M) were injected directly into the flask. After 15 minutes reaction a polymer was obtained which was shown to be clearly bimodal when analyzed by GPC. The molecular weight Mw=108, 900 and the polydispersity Mw/Mn=11.54.

Example 3

This example describes the preparation of a bimodal polyethylene. The method for preparing the polyethylene is similar to the procedure described in Example 2, but the boron compound was injected first, followed by the metallocene and finally the aluminoxane. The resulting polyethylene had a Mw=86,600 and a polydispersity of Mw/Mn= 12.51, the molecular weight distribution of the polymer being clearly bimodal, as shown by its chromatogram.

Example 4

This example describes the preparation of a bimodal polyethylene. This was prepared using the procedure described in Example 2, but first injecting a prepared mixture of methylaluminoxane and bis(cyclopentadienyl) zirconium dichloride in a molar ratio 10:1 which had been aged for 24 hours and in quantities such that the concentrations in the flask were 6.0 mmoles of MAO and 0.06 mmoles of $CP_2ZrCl_2$. 0.1 mmoles of $B(C_6F_5)_3$ were then added. The polyethylene had a molecular weight of Mw=115,500 and a polydispersity of Mw/Mn=10.35. The resulting chromatogram was clearly bimodal.

Example 5

This example describes the preparation of a bimodal polyethylene. The preparation was in accordance with the procedure described in Example 1a, but 10.0 mmoles of methylaluminoxane and 0.05 mmoles of $B(C_6F_5)_3$ were injected prior to injecting 14.62 mg (0.06 mmoles) of bis(cyclopentadienyl) zirconium dichloride. The chromatogram of the resulting polymer showed a bimodal molecular weight distribution as-shown in the chromatogram in FIG. 1.

Example 6

This example describes the preparation of a bimodal ethylenehexene copolymer. The copolymer in this example was prepared in accordance with the procedure described in Example 1a, adding 1.97 ml (15.87 mmoles) of 1-hexene when the reactor was saturated with ethylene and at 40° C. Once this had been added the temperature was raised to 90° C. 2.0 mmoles of MAO, 0.02 mmoles of $B(C_6F_5)_3$ and 0.02 mmoles of zirconocene were then added. After 15 minutes reaction 27.07 g of a polyethylene having a molecular weight of Mw=62,400 and a polydispersity of Mw/Mn=8.2, with a clearly bimodal chromatogram, were obtained.

Example 7

Figure 2:
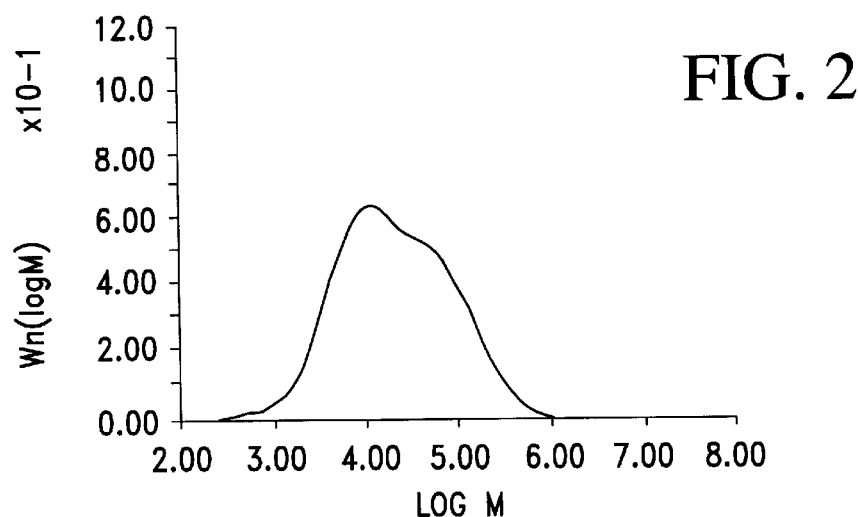
FIG. 2 illustrates molecular weight distributions produced by example 7 of the specification.

This example describes the preparation of a bimodal polyethylene. The polyethylene in this example was prepared in accordance with the procedure described in Example 1a, but adding 2.0 mmoles of MAO and 0.02 mmoles of $B(C_6F_5)_3$. The reaction was completed in the presence of 0.2 bar of hydrogen. After 15 minutes reaction 28.31 g of a polyethylene whose molecular weight distribution from the chromatogram was clearly bimodal, as shown by the chromatogram in FIG. 2, was obtained.

Example 8

This example describes the preparation of a bimodal polyethylene. It was prepared in accordance with the procedure described in Example 2, but using 50.0 mmoles of methylaluminoxane, 0.1 mmoles of $B(C_6F_5)_3$ and 36.23 mg (0.1 mmoles) of (pentamethylcyclopentadienyl)(cyclopentadienyl) zirconium dichloride. The resulting polymer yielded a bimodal chromatogram, had a molecular weight of Mw=105,900 and a polydispersity of Mw/Mn=8.57. The zirconocene was synthesized in accordance with the methods described in the literature.

Example 9

This example describes the preparation of a bimodal polyethylene. It was prepared in accordance with the procedure described in Example 2, but using 10.0 mmoles of methylaluminoxane, 5.0 mmoles of trimethyl aluminium and 0.1 mmoles of biscyclopentadienyl zirconium dichloride. The polyethylene had a molecular weight of Mw=50,800 and a polydispersity of Mw/Mn=6.06. The molecular weight distribution was clearly bimodal as shown by its chromatogram.

Example 10

This example describes the preparation of a bimodal polyethylene. It was prepared in accordance with the procedure described in Example 2, but using 15.0 mmoles of triethylaluminium, 0.1 mmoles of $(C_6F_5)_3$ and 29.02 mg (0.1 mmoles) of biscyclopentadienyl zirconium dichloride. The bimodal polymer had a molecular weight of Mw=103,600 and a polydispersity of Mw/Mn=6.79. The GPC chromatogram indicated its bimodal nature.

Example 11

Figure 3:
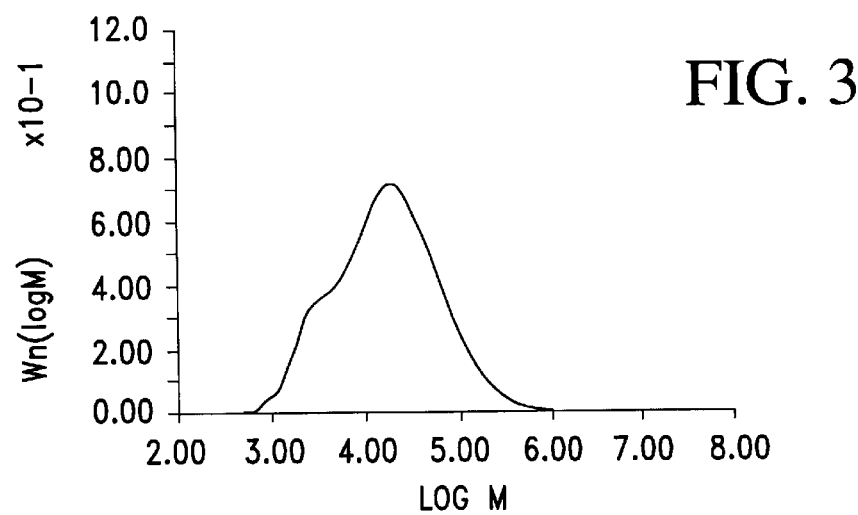
FIG. 3 illustrates molecular weight distributions produced by example 11 of the specification.

This example describes the preparation of a bimodal polyethylene. It was prepared in accordance with the procedure described in Example 2, but using 10.0 mmoles of methylaluminoxane, 15.0 mmoles of triisobutyl aluminium and 0.1 mmoles of biscyclopentadienyl zirconium dichloride. The molecular weight distribution was found to be clearly bimodal by chromatography, as shown by the chromatogram in FIG. 3.

Example 12

This example describes the preparation of a bimodal polyethylene. It was prepared in accordance with the procedure described in Example 2, but using 15.0 mmoles of methyl aluminoxane, 7.5 mmoles of triisobutylaluminoxane, 0.1 mmoles of $B(C_6F_5)_3$ and 29.02 mg (0.1 mmoles) of biscyclopentadienyl zirconium dichloride. The polymer had a molecular weight of Mw=97,500 and a polydispersity of Mw/Mn=6.89. The molecular weight distribution as shown by the GPC chromatogram was clearly bimodal.

What is claimed is:

1. A process for obtaining homopolymers or copolymers of ethylene with wide bimodal or multimodal molecular weight distributions, wherein ethylene, alone or with an alpha olefin, is polymerized in the presence of a catalyst system which consists of:

(a) a single supported or unsupported metallocene catalyst being a mono, or dicyclopentdienyl of transition metals in any of groups 4b, 5b, 6b of the Periodic Table of elements represented by the formulae:

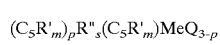

or

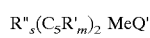

where $(C_5R'_m)$ is cyclopentadienyl or substituted cyclopentadienyl, each R' may be the same or different and may be hydrogen, monohydrocarbon radicals selected from the group consisting alkyl, alkenyl, aryl, alkylaryl or arylalkyl containing from 1 to 20 carbon atoms, or two adjacent carbon atoms joined to form a $C_4$–$C_6$ ring, where R" is an alkylene radical containing from 1 to 4 carbon atoms, a dialkyl germanium, a dialkyl silicon radical or an alkylphosphine or amino radical joining two $(C_5R'_m)$ rings, Q is a hydrocarbon radical selected from the group consisting of aryl, alkyl, alkenyl, alkylaryl, and arylalkyl containing from 1 to 20 carbon atoms, optionally halogen, and each of said hydrocarbon radicals may be the same or different, Q' is an alkylidine radical containing from 1 to 20 carbon atoms, Me is a transition metal in groups 4b, 5b or 6b of the Periodic Table of elements, s is 0 or 1, p is 0, 1 or 2; when p is 0, s is 0; m is 4 if s is 1 and m is 5 if s is 0;

(b) a co-catalyst formed by a combination of an aluminum compound having Al—O bonds corresponding to the formulae:

$$(RAlO)_n$$

or $$R(R-Al-O)_n AlR_2$$

where R is an alkyl or aryl group containing from 1 to 20 carbon atoms, and n is a number from 1 to 20, and at least one Boron compound corresponding to the general formulae:

$$BX^1X^2X^3$$

or $$(Y)(BX^1X^2X^3X^4)$$

where B is boron, and $X^1$, $X^2$, $X^3$, $X^4$ are the same or different and may be hydride, halide, alkyl containing from 1 to 20 carbon atoms, substituted alkyls containing from 1 to 20 carbon atoms in which one or more hydrogens are substituted by halogens, metal hydrocarbon radicals (organometalloids) in which each substitution contains from 1 to 20 carbon atoms, and the metal is selected from the group consisting of group 4a of the Periodic Table of elements, aryl, and substituted aryls containing from 6 to 20 carbon atoms and Y is a Bronsted acid, optionally in the presence of at least one alkyl aluminum of formula $$AlR'''_3$$

where the R''' groups, which may be the same or different, may be alkyls or aryls containing from 1 to 20 carbon atoms or halogens, and Al is aluminum.

2. The process of claim 1, wherein the alpha olefin is ethylene.

3. The process of claim 2, wherein the alpha olefin is selected from the group consisting of 1-butene, 1-hexene or 1-octene and is incorporated at random.

4. The process of claim 1, which further comprises the use of a hydrocarbon solvent under inert conditions.

5. The process of claim 1, wherein the reaction temperature is between −60° C. and 280° C.

6. The process of claim 5, wherein the reaction temperature is between 40° C. and 160° C.

7. The process of claim 1, wherein the reactor pressure is between 1 and 500 atmospheres.

8. The process of claim 1, wherein the polymerization is conducted in the presence of hydrogen.

9. The process of claim 1, wherein the metallocene is bis(cyclopentadienyl) zirconium dichloride.

10. The process of claim 1, wherein the aluminium compound is methyl aluminoxane and the boron compound is tris (pentafluorophenyl) borane.

11. The process of claim 1, wherein the alkyl aluminium compound is selected from the group consisting of trimethyl aluminium, triethyl aluminium or triisobutyl aluminium.

12. The process of claim 1, wherein the molar ratio of aluminium compound to metallocene catalyst in the catalytic system is between from $1.0:1.0$ to $10^8:1.0$ and the molar ratio of aluminium compound and/or aluminoxane to boron is between $0.01:1$ to $10^{4:1.0}$.

13. The process of claim 12, wherein the molar ratio of aluminium compound to metallocene catalyst in the catalytic system is between from $5.0:1.0$ to $10^5:1.0$ and the molar ratio of aluminium compound and/or aluminoxane to boron is between $0.01:1$ to $10^3:1.0$.

14. The process of claim 1 wherein the Bronsted acid is selected from the group consisting of H+, ammonium or substituted ammonium cations wherein up to 3 of the hydrogen atoms may be replaced with a $C_1$–$C_{20}$ hydrocarbon radical, one or more of the hydrogen atoms optionally substituted with halogen, phosphonium or a substituted phosphonium radical wherein up to 3 of the hydrogen atoms may be replaced with a $C_1$–$C_{20}$ hydrocarbon radical, one or more of the hydrogen atoms optionally substituted with halogen or a carbene radical in which up to 3 of the hydrogen atoms may be replaced with a $C_1$–$C_{20}$ hydrocarbon radical, one or more of the hydrogen atoms being optionally substituted with a halogen.

15. The process of claim 1 wherein the Boron compound is selected from the group consisting of triphenyl borane, pentafluorophenyl diphenyl borane, tris(pentafluorophenyl) borane, tris(3,5-di-trifluoromethylphenyl) borane, and triphenylcarbene tetrakis(pentafluorophenyl) borane.

16. A process for obtaining homopolymers or copolymers of ethylene with wide bimodal or multimodal like molecular weight distributions, wherein ethylene, alone or with an alpha olefin, is polymerized in the presence of a catalyst system within a reaction vessel wherein the catalyst system includes:

(a) a single supported or unsupported metallocene catalyst being a mono, or dicyclopentadienyl of transition metals in any of groups 4b, 5b, 6b of the Periodic Table of elements represented by the formulae:

$$(C_5R'_m)_p R''_s (C_5R'_m) MeQ_{3-p}$$

or $$R''_s(C_5R'_m)_2 MeQ'$$

where $(C_5R'_m)$ is cyclopentadienyl or substituted cyclopentadienyl, each R' may be the same or different and may be hydrogen, monohydrocarbon radicals selected from the group consisting alkyl, alkenyl, aryl, alkylaryl or arylalkyl containing from 1 to 20 carbon atoms, or two adjacent carbon atoms joined to form a $C_4$–$C_6$ ring, where R'' is an alkylene radical containing from 1 to 4 carbon atoms, a dialkyl germanium, a dialkyl silicon radical or an alkylphosphine or amino radical joining two $(C_5R'_m)$rings, Q is a hydrocarbon radical selected from the group consisting of aryl, alkyl, alkenyl, alkylaryl, and arylalkyl containing from 1 to 20 carbon atoms, optionally halogen, and each of said hydrocarbon radicals may be the same or different, Q' is an alkylidine radical containing from 1 to 20 carbon atoms, Me is a transition metal in groups 4b, 5b or 6b of the Periodic Table of elements, s is 0 or 1, p is 0, 1 or 2; when p is 0, s is 0; m is 4 if s is 1 and m is 5 if s is 0;

(b) a co-catalyst formed by a combination of an aluminum compound having Al—O bonds corresponding to the formulae:

$$(RAlO)_n$$

or $$(R-Al-O)_n AlR_2$$

where R is an alkyl or aryl group containing from 1 to 20 carbon atoms, and n is a number from 1 to 20, and at least one Boron compound corresponding to the general formulae:

$$BX^1X^2X^3$$

or $$(Y)(BX^1X^2X^3X^4)$$

where B is boron, and $X^1$, $X^2$, $X^3$, $X^4$ are the same or different and may be hydride, halide, alkyl containing from 1 to 20 carbon atoms, substituted alkyls containing from 1 to 20 carbon atoms in which one or more hydrogens are substituted by halogens, metal hydrocarbon radicals (organometalloids) in which each substitution contains from 1 to 20 carbon atoms, and the metal is selected from the group consisting of group 4a of the Periodic Table of elements, aryl, and substituted aryls containing from 6 to 20 carbon atoms and Y is a Bronsted acid, optionally in the presence of at least one alkyl aluminum of formula $$AlR'''_3$$

where the R''' groups, which may be the same or different, may be alkyls or aryls containing from 1 to 20 carbon atoms or halogens, and Al is aluminum, and wherein the catalyst and co-catalyst are present within a reaction vessel.

17. A process for obtaining homopolymers of or copolymers of ethylene with wide bimodal or multimodal molecular weight distributions, wherein ethylene, optionally with another alpha olefin, is polymerized in the presence of a catalyst system which consists of (a) a supported metallocene catalyst being mono, di or tricyclopentadienyl of transition metals in any of groups 4b, 5b, 6b of the Periodic Table of elements represented by the formulae:

$$(C_5R'_m)_p R''_s (C_5R'_m) MeQ_{3-p}$$

or $$R''_s (C_5R'_m)_2 MeQ'$$

where $(C_5R'_m)$ is cyclopentadienyl or substituted cyclopentadienyl, each R' may be the same or different and may be hydrogen, monohydrocarbon radicals selected from the group consisting of alkyl, alkenyl, aryl, alkylaryl or arylalkyl containing from 1 to 20 carbon atoms, or two adjacent carbon atoms joined to form a $C_4$-$C_6$ ring, where R'' is an alkylene radical containing from 1 to 4 carbon atoms, a dialkyl germanium, a dialkyl silicon radical or an alkylphosphine or amino radical joining two $(C_rR'_m)$ rings, Q is a hydrocarbon radical selected from the group consisting of aryl, alkyl, alkenyl, alkylaryl and arylalkyl containing from 1 to 20 carbon atoms, optionally halogen, and each of said hydrocarbon radicals may be the same or different, Q' is an alkylidine radical containing from 1 to 20 carbon atoms, Me is a transition metal in groups 4b, 5b or 6b of the Periodic Table of elements, s is 0 or 1, p is 0, 1 or 2; when p is 0, s is 0; m is 4 if s is 1 and m is 5 if s is 0;

(b) a co-catalyst formed by a combination of an aluminoxane compound corresponding to the formulae:

$$(RAlO)_n$$

or $$R(R—Al—O)_n AlR_2$$

where R is an alkyl or aryl group containing from 1 to 20 carbon atoms, and n is a number from 1 to 20, and at least one Boron compound corresponding to the general formulae:

$$BX^1X^2X^3$$

or $$(Y)(BX^1X^2X^3X^4)$$

where B is boron, and $X^1$, $X^2$, $X^3$, $X^4$ are the same or different and may be hydride, halide, alkyl containing from 1 to 20 carbon atoms, substituted alkyls containing from 1 to 20 carbon atoms in which one or more hydrogens are substituted by halogens, metal hydrocarbon radicals (organometalloids) in which each substitution contains from 1 to 20 carbon atoms, and the metal is selected from the group consisting of group 4a of the Periodic Table of elements, aryl, and substituted aryls containing from 6 to 20 carbon atoms and Y is a Bronsted acid optionally in the presence of at least one alkyl aluminium of formula $$AlR'''_3$$

where the R''' groups, which may be the same or different, may be alkyls or aryls containing from 1 to 20 carbon atoms or halogens, and Al is aluminium.

18. The process of claim 17 wherein the cocatalyst further comprises an alkylaluminium.

19. The process of claim 17, wherein the molar ratio of aluminium compound to metallocene catalyst in the catalytic system is between from 1.0:1.0 to $10^8$:1.0 and the molar ratio of aluminoxane compound to boron is between 0.01:1 to $10^4$:1.0.

20. The process of claim 17, wherein the molar ratio of aluminium compound to metallocene catalyst in the catalytic system is between from 5.0:1.0 to $10^5$:1.0 and the molar ratio of aluminoxane compound to boron is between 0.01:1 to $10^3$:1.0.

21. A process for obtaining homopolymers or copolymers of ethylene with wide bimodal or multimodal molecular weight distributions, wherein ethylene, alone or with an alpha olefin, is polymerized in the presence of a catalyst system within a reaction vessel wherein the catalyst system includes:

(a) a single supported or unsupported metallocene catalyst being a mono, or dicyclopentadienyl of transition metals in any of groups 4b, 5b, 6b of the Periodic Table of elements represented by the formulae:

$$(C_5R'_m)_p R''_s (C_5R'_m) MeQ_{3-p}$$

or $$R''_s (C_5R'_m)_2 MeQ'$$

where $(C_5R'_m)$ is cyclopentadienyl or substituted cyclopentadienyl, each R' may be the same or different and may be hydrogen, monohydrocarbon radicals selected from the group consisting alkyl, alkenyl, aryl, alkylaryl or arylalkyl containing from 1 to 20 carbon atoms, or two adjacent carbon atoms joined to form a $C_4$–$C_6$ ring, where R" is an alkylene radical containing from 1 to 4 carbon atoms, a dialkyl germanium, a dialkyl silicon radical or an alkylphosphine or amino radical joining two $(C_5R'_m)$rings, Q is a hydrocarbon radical selected from the group consisting of aryl, alkyl, alkenyl, alkylaryl, and arylalkyl containing from 1 to 20 carbon atoms, optionally halogen, and each of said hydrocarbon radicals may be the same or different, Q is an alkylidine radical containing from 1 to 20 carbon atoms, Me is a transition metal in groups 4b, 5b or 6b of the Periodic Table of elements, a is 0 or 1, p is 0, 1 or 2; when p is 0, s is 0; m is 4 if s is 1 and m is 5 if e is 0;

(b) a co-catalyst formed by a combination of an aluminoxane compound corresponding to the formulae:

$(RAlO)_n$ or $R(R-Al-O)_nAlR_2$ where R is an alkyl or aryl group containing from 1 to 20 carbon atoms, and n is a number from 1 to 20, and at least one Boron compound corresponding to the general formulae:

$BX^1X^2X^3$ or $(Y) (BX^1X^2X^3X^4)$ where B is Boron, and $X^1$, $X^2$, $X^3$, $X^4$ are the same or different and may be hydride, halide, alkyl containing from 1 to 20 carbon atoms, substituted alkyls containing from 1 to 20 carbon atoms in which one or more hydrogens are substituted by halogens, metal hydrocarbon radicals (organometalloids) in which each substitution contains from 1 to 20 carbon atoms, and the metal is selected from the group consisting of group 4a of the Periodic Table of elements, aryl, and substituted aryls containing from 6 to 20 carbon atoms and Y is a Bronsted acid, optionally in the presence of at least one alkyl aluminum of formula $AlR'''_3$ where the R'''groups, which may be the same or different, may be alkyls or aryls containing from 1 to 20 carbon atoms or halogens, and Al is aluminum, and wherein the catalyst and co-catalyst are present within a reaction vessel.

22. The process of claim 21 wherein the cocatalyst further comprises an alkylaluminium.

23. The process of claim 21, wherein the molar ratio of aluminium compound to metallocene catalyst in the catalytic system is between from 1.0:1.0 to $10^8$:1.0 and the molar ratio of aluminoxane compound to boron is between 0.01:1 to $10^4$:1.0.

24. The process of claim 21, wherein the molar ratio of aluminium compound to metallocenecatalyst in the catalytic system is between from 5.0:1.0 to $10^5$:1.0 and the molar ratio of aluminoxane compound to boron is between 0.01:1 to $10^3$:1.0.

* * * * *